US008600839B2

(12) United States Patent
Westphal

(10) Patent No.: US 8,600,839 B2
(45) Date of Patent: *Dec. 3, 2013

(54) SYSTEM AND METHOD FOR PROVIDING ACCESS TO PRODUCT RELATED ELECTRONIC CATALOG FUNCTIONALITY

(71) Applicant: W.W. Grainger, Inc., Lake Forest, IL (US)

(72) Inventor: Geoffry A. Westphal, Evanston, IL (US)

(73) Assignee: W.W. Grainger, Inc., Lake Forest, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/871,153

(22) Filed: Apr. 26, 2013

(65) Prior Publication Data

US 2013/0238466 A1    Sep. 12, 2013

Related U.S. Application Data

(63) Continuation of application No. 13/630,760, filed on Sep. 28, 2012, which is a continuation of application No. 13/530,632, filed on Jun. 22, 2012, now Pat. No. 8,341,030, which is a continuation of application No. 13/354,773, filed on Jan. 20, 2012, now Pat. No. 8,285,605, which is a continuation of application No. 13/195,158, filed on Aug. 1, 2011, now Pat. No. 8,249,951, which is a continuation of application No. 12/175,598, filed on Jul. 18, 2008, now Pat. No. 8,019,660.

(51) Int. Cl.
*G06Q 30/00* (2012.01)

(52) U.S. Cl.
USPC .............................. 705/27.2; 705/26.1

(58) Field of Classification Search
USPC ........................ 705/27.2, 27.1, 26.1
See application file for complete search history.

(56) References Cited

U.S. PATENT DOCUMENTS

| 7,610,219 B2* | 10/2009 | Sayed | 705/26.2 |
|---|---|---|---|
| 2003/0023514 A1* | 1/2003 | Adler et al. | 705/27 |
| 2003/0144924 A1* | 7/2003 | McGee | 705/27 |
| 2004/0098315 A1* | 5/2004 | Haynes et al. | 705/26 |

OTHER PUBLICATIONS

"E-Commerce Vendor ShopSite Announces Version 7 of Leading Shopping Cart System" (PR Newswire. New York: Dec. 15, 2003. p. 1).*

* cited by examiner

*Primary Examiner* — Courtney Stopp
(74) *Attorney, Agent, or Firm* — Greenberg Traurig, LLP

(57) ABSTRACT

An aggregation of functionality related to a product within an electronic catalog hosted by a wholesaler web system is provided by presenting on a client computing device a webpage in which a single product is directly associated with a single access point. The single access point provides a means by which plural wholesaler web system functions related to the single product are made available to a consumer. A listing of the plural wholesaler web system functions related to the single product is displayed within the webpage in response to an activation of the single access point by the consumer. In response to a selection by the consumer from the displayed listing the wholesaler web system initiates a performance of the one of the plural wholesaler web system functions so selected.

15 Claims, 2 Drawing Sheets

SYSTEM AND METHOD FOR PROVIDING ACCESS TO PRODUCT RELATED ELECTRONIC CATALOG FUNCTIONALITY

CROSS REFERENCE TO RELATED APPLICATION

This application claims the benefit of and is a continuation of U.S. application Ser. No. 13/630,760, filed on Sep. 28, 2012, which application claims the benefit of and is a continuation of U.S. application Ser. No. 13/530,632, filed on Jun. 22, 2012, which application claims the benefit of and is a continuation of U.S. application Ser. No. 13/354,773, filed on Jan. 20, 2012, which application claims the benefit of and is a continuation of U.S. application Ser. No. 13/195,158, filed on Aug. 1, 2011, which application claims the benefit of and is a continuation of U.S. application Ser. No. 12/175,598, filed on Jul. 18, 2008, the disclosures of which are incorporated herein by reference in their entirety.

BACKGROUND

Currently, e-commerce related websites, whether business to business (B2B) or business to consumer (B2C), provide many methods for a customer to navigate a website to access functionality. Such functionality includes, but is not limited to, category drill down searching, parametric searching, key word searching, cross reference searching, accessing sales and promotional fliers, viewing personal order histories, etc. While navigating a website, any number of options are also made available for the customer to "act upon" a particular product. For example, the customer may want to add a product to a to-do list, add a product to a shopping cart, send an email to another person about a product, proceed to a Detail Page for a product, request an MSDS sheet for a product, etc. However, current websites place this product related functionality in many different places on any given webpage or on different webpages throughout a website. This non-uniform placement of product related functionality thus yields an inconsistent customer experience by, for example, making it difficult for the customer to find and utilize desired product related functionality on a given webpage and/or within a given website. As will be appreciated, lower usage of this valuable product related functionality results in lower sales for a vendor/wholesaler as well as lower customer satisfaction.

SUMMARY

An aggregation of functionality related to a product within an electronic catalog hosted by a wholesaler web system is provided by presenting on a client computing device a webpage in which a single product is directly associated with a single access point. The single access point provides a means by which plural wholesaler web system functions related to the single product are made available to a consumer. A listing of the plural wholesaler web system functions related to the single product is displayed within the webpage in response to an activation of the single access point by the consumer. In response to a selection by the consumer from the displayed listing the wholesaler web system initiates a performance of the one of the plural wholesaler web system functions so selected.

A better understanding of the objects, advantages, features, properties and relationships of the system and method described hereinafter will be obtained from the following detailed description and accompanying drawings which set forth illustrative embodiments.

BRIEF DESCRIPTION OF THE DRAWINGS

For a better understanding of the system and method for providing access to product related electronic catalog functionality described hereinafter, reference may be had to preferred embodiments shown in the following drawings in which.

DETAILED DESCRIPTION

Figure 1:
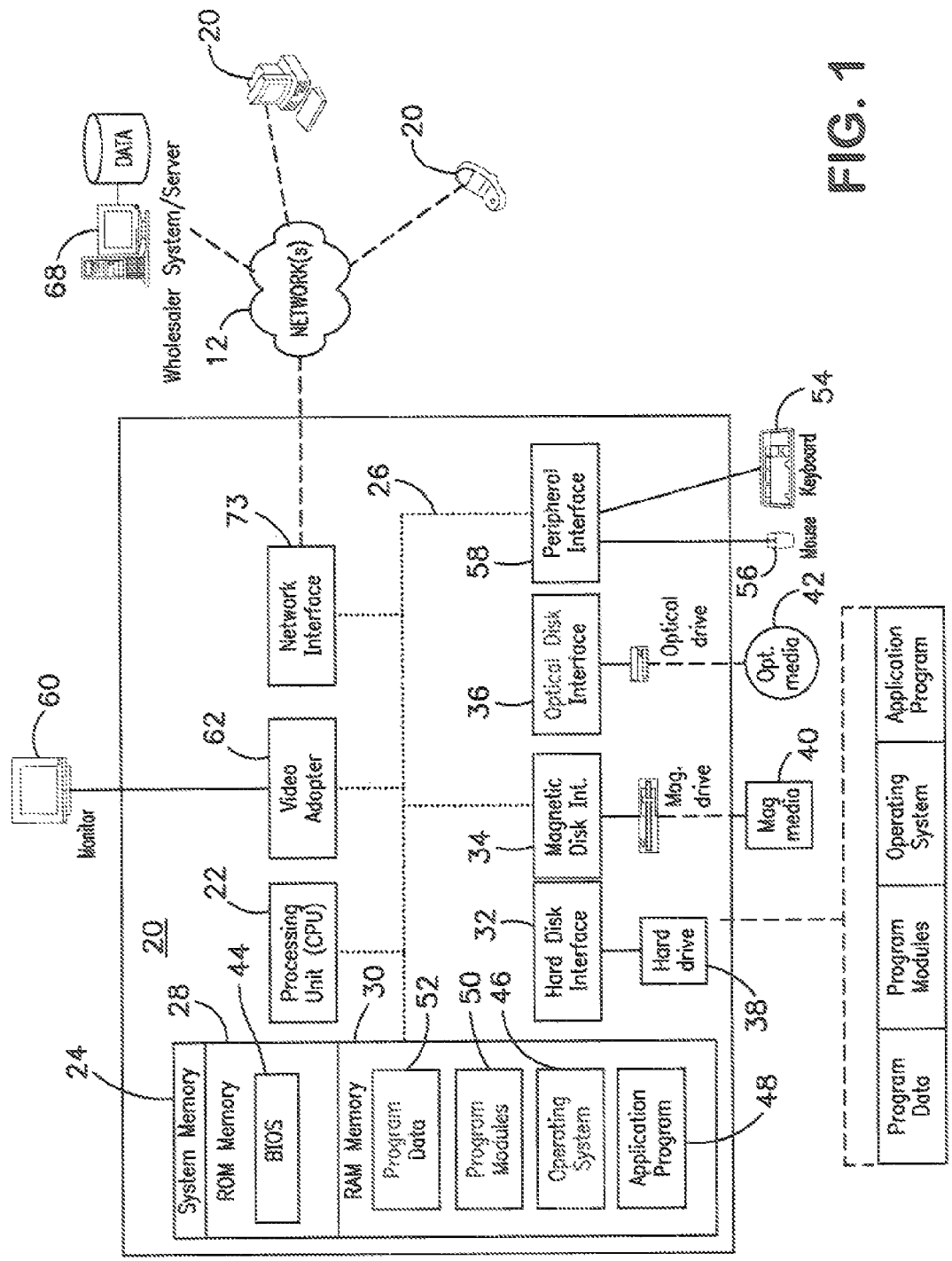
FIG. 1 illustrates a block diagram of an exemplary system in which the inventive concepts may be employed.

Turning to the drawings an exemplary system and method for providing access to product related electronic catalog functionality is now described. As illustrated in FIG. 1, an exemplary system in which the subject inventive concepts may be employed includes a processing device 20, illustrated in detail by way of example only as a computer system, that is provided with executable instructions to, for example, provide a means for a customer to access a website, via a computer system/server 68, and thereby browse webpages and goods/services offered for sale by a wholesaler, retailer, vender, etc., (collectively "wholesaler") and access electronic commerce related functionality. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant (PDA), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more multiple processing devices.

For performing the various tasks in accordance with the executable instructions, a processing device 20 may include a processing unit 22 and a system memory 24 which may be linked via a bus 26. Without limitation, the bus 26 may be a memory bus, a peripheral bus, and/or a local bus using any of a variety of well known bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules, i.e., computer executable instructions, may be stored in one or more of the memory/media devices of the processing device 20. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to the processing device 20 as needed, for example, via a network connection.

The customer may enter commands and information into the processing device 20 through input devices such as a keyboard 54 and/or a pointing device 56. While not illustrated, other input devices may include a microphone, a joystick, a game pad, a scanner, etc. These and other input/output devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As further illustrated in FIG. 1, the processing device 20 may also utilize logical connections to one or more remote processing devices, such as the wholesaler system/server 68. The remote processing devices may have an associated data repository in which is stored data such as customer/company information, electronic catalog pages, etc. While the remote processing device 68 has been illustrated in the exemplary form of a server computer supporting conventional e-commerce type functionality, e.g., category drill down searching, parametric searching, key word searching, cross reference searching, accessing sales and promotional fliers, product ordering, viewing personal order histories, etc, it will be appreciated that the remote processing devices 68 may be any type of device having processing capabilities. As such, it will again be appreciated that the remote processing device 68 need not be implemented as a single device but may be implemented in a manner such that the tasks performed by the remote processing device 68 are distributed to a plurality of processing devices linked through a communication network.

For performing tasks as needed, the remote processing device 68 may include many or all of the elements described above relative to the processing device 20. Communications between the processing device 20 and the remote processing device 68 may be exchanged via a further processing device, such a network router, that is responsible for network routing. Communications with the network router may be performed via a network interface component 73. Thus, within such a networked environment 12, e.g., the Internet, World Wide Web, LAN, or other like type of wired or wireless network, it will be appreciated that program modules depicted relative to the processing device 20, or portions thereof, may be stored in the memory storage device(s) of one or more processing devices in communication therewith.

As noted above, a customer generally interacts with wholesaler system/server 68 to browse an electronic catalog of goods offered for sale by the wholesaler, to order/purchase goods of interest, to request delivery of such goods, etc. To facilitate these processes, the wholesaler system/server 68 provides access to product related electronic catalog functionality that is aggregated and made conveniently accessible on a webpage. More particularly, as illustrated in the exemplary webpage of FIG. 2, the wholesaler system/server 68 provides in direct association with a product navigated to by a customer 202 or otherwise presented to a customer for purchase 204, an access point 206, presented in the form of a clickable icon, link, dropdown selection box, pop-up box, or the like, by which the customer may navigate to or other access product related functionality for the single, particular product so associated with the access point 206. In this manner, each access point 206 provides access to aggregated product related functionality by which, for example, the customer may: cause a display of a Product Details page for its associated product; cause a display of a Catalog Page (for example a PDF catalog page) on which its associated product resides; cause an email or similar message to be sent to a recipient about its associated product; cause its associated product to be added to a to-do list; cause its associated product to be added to a schedule for repeat purchase; cause an MSDS sheet, if available, for its associated product to be displayed; cause a display of listings related to its associated product; cause a display of required and optional accessories for its associated product; cause a display of its associated product's real-time availability; cause a display of a list of locations at which its associated product is available; cause a display of an indicator as to whether its associated product has been previously purchased by the customer; cause display of repair information for its associated product; cause a display of lot quantity price discounts for its associated product; display of an indicator, e.g., a checkmark, if a particular product related functionality is available to be initiated by the wholesaler web system, etc.

Figure 2:
FIG. 2 illustrates an exemplary webpage that provides providing access to aggregated product related functionality.

The access point 206 may be directly associated with a single, particular product presented within a webpage by placing the access point 206 (e.g., an activatable icon or like interface convention) near or next to its associated product. The access point 206 may then be activated to present product related functionality by being clicked upon, moused over. In a preferred embodiment, the access point 206 is placed in the near vicinity of an ordering number, e.g., "4M100" or "4M096" as illustrated in FIG. 2, to indicate the direct association between an access point 206 and the product that corresponds to that ordering number, i.e., each single access point 206 is directly associated with a single, corresponding product. Still further, an access point 206 offering access to aggregated product related functionality pertaining to a single, particular, associated product may be placed adjacent to each ordering number on every webpage within a website. Thus, an access point 206 for a particular product may appear multiple times throughout the website depending upon where its related ordering number might appear, such as for example, on webpages having: an online flier; an online promotion; a personal order history; an invoice history; a Product Details page (as particularly seen in FIG. 2); a search result; a Shopping Cart, Order Form or like purchasing page/area; a product listings page or area; a Cross Reference list; a product description page; a Catalog Page (in any format, e.g., PDF, HTML, etc.); a selection guide; etc. It will be understood that the product related functionality that may be made available for accessing by the consumer need not be the same for each product, e.g., one product might not have repair parts and, as such, the repair part availability functionality would not be applicable for that product. Furthermore, it will be appreciated that, when a user selects a product related function via an access point (in the event that such functionality is available for the corresponding product) the wholesaler web system may initiate a performance of the selected functionality by providing the selected functionality and related information, if any, in a pop-up window or other area of a webpage currently being viewed, by redirecting the browser of the client machine to a further webpage that is directly supported by the wholesaler system, by redirecting the browser of the client machine to a webpage that is supported by a third party system, and/or the like.

While specific embodiments of the invention have been described in detail, it will be appreciated by those skilled in the art that various modifications and alternatives to those details could be developed in light of the overall teachings of the disclosure. For example, rather than provide a separate, distinct access point icon for each product, the access point may be integrated into a picture of the product shown in connection with its ordering number whereupon a mouse over the picture or click upon the picture invokes a listing of the available product related functionality for that product. Accordingly, the particular arrangement disclosed is meant to be illustrative only and not limiting as to the scope of the invention which is to be given the full breadth of the appended claims and any equivalents thereof.

What is claimed is:

1. A non-transient, computer readable media having stored thereon instructions for providing access to an aggregation of functionality related to a product within an electronic catalog hosted by a wholesaler web system, the instructions performing steps comprising:

causing an invoice history to be displayed on a client computing device, the invoice history comprising a listing of a plurality of products that are available for purchase from the wholesaler and wherein each of the plurality of products in the listing is directly associated with a corresponding one of a plurality of access points, each of the plurality of access points providing access to a subset of wholesaler web system functions that have been determined to be applicable to the corresponding one of the plurality of products in the listing;

in response to an activation of a one of the plurality of access points corresponding to a one of the plurality of products in the listing causing a plurality of user interface elements, each corresponding to a one of a subset of the wholesaler web system functions that have been determined to be applicable to the one of the plurality of products in the listing corresponding to the one of the plurality of access points activated, to be presented on the client computing device; and in response to a selection of a one of the plurality of user interface elements from the presented plurality of user interface elements causing a performance by the wholesaler web system of a one of the wholesaler web system functions that corresponds to the selected one of the plurality of user interface elements.

2. The computer-readable media as recited in claim 1, wherein each of the plurality of access points is activated in response to user selection action.

3. The computer-readable media as recited in claim 2, wherein the user selection action is at least one of a input device selection, a client computing device tap, a client computing device movement; or a client computing device touch.

4. The computer-readable media as recited in claim 2, wherein each of the plurality of access points is activated in response to at least one of an input device hover over action.

5. The computer-readable media as recited in claim 1, wherein each of the plurality of access points comprises information representative of a corresponding one of the plurality of products in the listing.

6. The computer-readable media as recited in claim 1, wherein each of the plurality of access points is directly associated with a corresponding one of the plurality of products in the listing by being positioned in the vicinity of at least one of an image, title, product number, or description for the corresponding one of the plurality of products in the listing.

7. The computer-readable media as recited in claim 1, wherein each of the plurality of access points comprises an activatable selection button to invoke access to the subset of wholesaler web system functions when selected.

8. The computer-readable media as recited in claim 1, wherein each of the plurality of access points comprises an icon that is activatable to invoke a menu, the menu comprising the plurality of user interface elements.

9. The computer-readable media as recited in claim 1, wherein each of the plurality of user interface elements is selectable to initiate a performance by the wholesaler web system of at least two of: displaying of a Product Details page for the one of the plurality of products in the listing corresponding to the one of the plurality of access points activated; displaying of a detailed description for the one of the plurality of products in the listing corresponding to the one of the plurality of access points activated; displaying of a catalog page from a catalog on which the resides the one of the plurality of products in the listing corresponding to the one of the plurality of access points activated; transmitting a message to a recipient containing information for the one of the plurality of products in the listing corresponding to the one of the plurality of access points activated; adding the one of the plurality of products in the listing corresponding to the one of the plurality of access points activated to a list; adding the one of the plurality of products in the listing corresponding to the one of the plurality of access points activated to a schedule for repeat purchase; displaying an MSDS sheet for the one of the plurality of products in the listing to the one of the plurality of access points activated; displaying accessories for the one of the plurality of products in the listing corresponding to the one of the plurality of access points activated; displaying real-time availability for the one of the plurality of products in the listing corresponding to the one of the plurality of access points activated; displaying a list of locations at which the one of the plurality of products in the listing corresponding to the one of the plurality of access points activated is available; displaying repair information for the one of the plurality of products in the listing corresponding to the one of the plurality of access points activated; displaying at least one of rating or recommendation information for the one of the plurality of products in the listing corresponding to the one of the plurality of access points activated; displaying shipping information for the one of the plurality of products in the listing corresponding to the one of the plurality of access points activated; displaying at least one of a local wholesaler establishment availability or pricing for the one of the plurality of products in the listing corresponding to the one of the plurality of access points activated; providing a user selectable link for sharing at least one of a navigatable link or information regarding the one of the plurality of products in the listing corresponding to the one of the plurality of access points activated with at least one of another user or another webpage; displaying an indication of a redeemable reward value associated with the one of the plurality of products in the listing corresponding to the one of the plurality of access points activated; displaying information regarding at least one of the manufacturer or wholesaler name for the one of the plurality of products in the listing corresponding to the one of the plurality of access points activated; or displaying a discount offer associated with the one of the plurality of products in the listing corresponding to the one of the plurality of access points activated.

10. The computer-readable media as recited in claim 9, wherein the plurality of user interface elements are presented in a pop-up window within the client computing device.

11. The computer-readable media as recited in claim 1, wherein the plurality of user interface elements are presented in a pop-up window.

12. The computer-readable media as recited in claim 1, wherein the plurality of user interface elements are presented in an area of a webpage.

13. The computer-readable media as recited in claim 1, wherein the wholesaler web system performs the one of the wholesaler web system functions by redirecting a browser of the client machine to a webpage.

14. The computer-readable media as recited in claim 13, wherein the webpage is located within the wholesaler web system.

15. The computer-readable media as recited in claim 13, wherein the webpage is located within a web system of a third party.

* * * * *